United States Patent

Stephinson

[11] Patent Number: 5,368,904
[45] Date of Patent: Nov. 29, 1994

[54] BULLET RESISTANT GLASS

[76] Inventor: William P. Stephinson, 14 Treatts Road, Lindfield, NSW 2070, Australia

[21] Appl. No.: 79,137

[22] Filed: Jun. 14, 1993

Related U.S. Application Data

[63] Continuation of Ser. No. 646,759, Jan. 14, 1991, abandoned.

Foreign Application Priority Data

Jul. 18, 1988 [AU] Australia ............... PI 9361

[51] Int. Cl.$^5$ ............... E06B 3/24
[52] U.S. Cl. ............... 428/34; 428/213; 428/332; 428/430; 428/911; 52/788
[58] Field of Search ............ 428/34, 430, 213, 220, 428/332, 339, 417, 94; 52/788, 790; 89/36.05, 36.11; 2/2.5

[56] References Cited

U.S. PATENT DOCUMENTS

| | | | |
|---|---|---|---|
| 4,312,903 | 1/1982 | Molari | 428/34 |
| 4,368,226 | 1/1983 | Mucaria | 428/34 |
| 4,614,676 | 9/1986 | Rehfeld | 428/34 |
| 4,687,687 | 8/1987 | Terea et al. | 428/34 |

FOREIGN PATENT DOCUMENTS 2483845  6/1980  France .

Primary Examiner—Donald J. Loney
Attorney, Agent, or Firm—Beveridge, DeGrandi, Weilacher & Young

[57] ABSTRACT

A bullet resistant glass screen is made of a number of glass sheets which can be standard thicknesses window glass, separated by air gaps. Security films, preferably made of polyester, are provided on the front and rear surfaces of the glass sheets. A pressure sensitive adhesive can be used to adhere the security films to the glass sheets. The resistance off the screen to penetration by a bullet is increased by increasing the thickness of the air gaps.

4 Claims, 1 Drawing Sheet

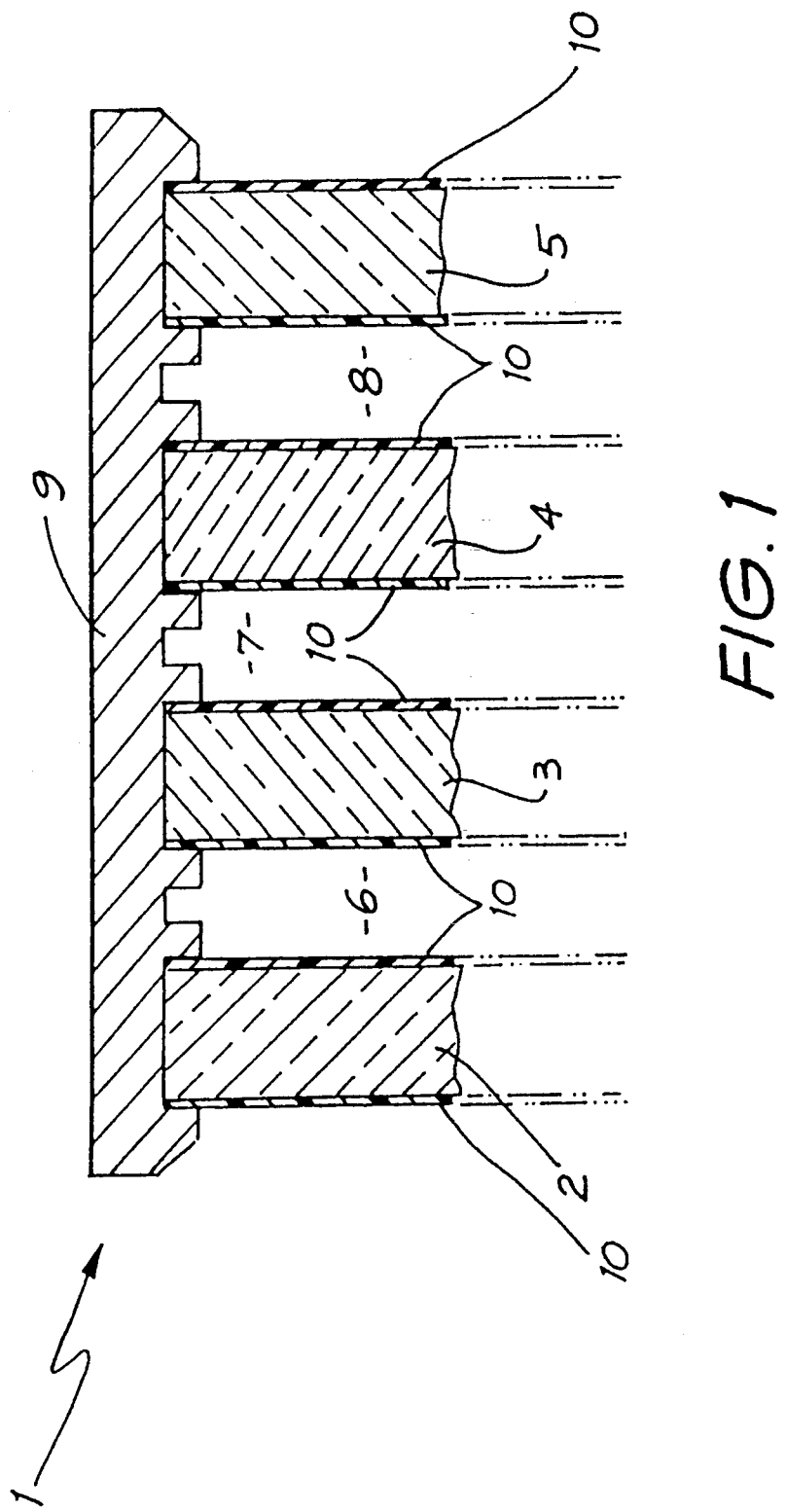

BULLET RESISTANT GLASS

REFERENCE TO RELATED APPLICATION

This is a continuation of U.S. patent application Ser. No. 07/646,759 filed Jan. 14, 1991, now abandoned.

FIELD OF INVENTION

This invention relates to an improvement in bullet-resistant glass screens in particular for use in security applications.

BACKGROUND OF THE INVENTION

Bullet proof glass comprises a laminate of generally heat treated annealed 394–472 mils (10–12 mm) glass sheets. For example, four sheets of this special glass are used to form a final laminate. This results in a sheet of glass which is from 1576–1970 mils (40–50 mm) thick. This makes the laminate expensive, difficult to machine and heavy to manipulate.

Other glazed structures for resisting the impact of projectiles are described in U.K. patent 2,098,650 and U.S. Pat. No. 4,774,143 both in the name of General Electric Company. The United Kingdom patent describes a glazed structure having a back laminate comprising a plurality of laminae of polycarbonate, glass or solid resinous materials, with at least one of said laminae being of polycarbonate, and a front laminate comprising a plurality of glass laminae, including a front lamina and a back lamina each of the latter laminae having a thickness of from 30 to 220 mils (0.76 to 5.59 mm) and an intermediate glass core having a thickness greater than either the front or the back lamina. The core in turn may be a single lamina or a plurality of laminae and preferably have a thickness of 220 to 1000 mils (5.59 to 25.4 mm).

The U.S. patent describes a transparent laminated window structure comprising a continuous inner layer of thermoplastic material, and an outer layer substantially parallel to the inner layer including at least a first course of discreet, mutually spaced glass segments, with the space between adjacent segments containing an adhesive material. The window structure may further comprise a strip of elastomeric material compressed between the inner and outer layers so as to define a gap between the layers. As the window structure comprises a number of segments a projectile will only fracture that segment and will not cause cracking in adjacent,.mutually spaced segments in the same course, allowing a high degree of visibility through the window structure upon impact by a projectile. The glass segments are themselves composed of glass laminae making the structure complex, thick and bulky.

Both these prior art specifications describe structures which have a front panel which is a laminate made with several glass laminae, characteristic of "bullet proof glass". Both of these specifications describe the use of an air gap between the front and back laminates of the structures. In the United Kingdom patent the air gap only adds to improve the optical characteristics of the double glazed laminate structure. In the U.S. patent the gas gap is described as not critical to the invention but merely included where the window structure may be exposed to alternating high and low temperature environments which might cause warpage between the front and rear panels of the structure.

Either of these structures would be complex to manufacture, could not be made on site, and would be heavy and expensive.

SUMMARY OF THE INVENTION

The present invention seeks to overcome these disadvantages in the prior art or at least to substantially ameliorate them by providing a bullet resistant glass screen including a plurality of sheets of glass, each sheet of glass having applied to at east one surface thereof a shatter resistant security film and each sheet of glass being separated from a neighbouring sheet of glass by a given separation.

Preferably, each sheet has a layer of the security film applied to each of the front and rear surfaces, while the gap between neighbouring sheets is filled with air.

The type of film that can be used for example is a polyester security film manufactured as shatter resistant film by the company 3M (Minnesota, Mining and Manufacturing Company). This film is applied to the surface of a glass sheet to prevent shattering of the sheet and the spraying of glass fragments. The film has a water activated pressure sensitive adhesive to bond it to the glass surface.

BRIEF DESCRIPTION OF THE DRAWINGS

FIG. 1 shows a schematic of the top half of a security screen according to the invention. For reasons of symmetry the bottom half is not shown.

PREFERRED MODES OF PERFORMING THE INVENTION

As shown in FIG. 1, a security screen 1 comprises a set of four sheets of window glass 2, 3, 4, and 5 respectively separated by a series of gaps, 6, 7 and 8.

For the purpose of illustration, glass sheet 2 will be considered the front of the screen 1.

The four sheets of glass, 2, 3, 4 and 5 are held in their fixed spatial relationship by a frame 9. The frame 9 can be any suitable structure made of material commonly used in the trade for example metal extrusion, wood or plastic.

Each of the sheets, 2, 3, 4 and 5 has applied to its front and rear surface a sheet of shatter resistant film 10. The spaces 6, 7 and 8 between the sheets 2, 3, 4 and 5 is filled with air.

The film 10 is applied to the faces of the sheets 2, 3, 4 and 5 in the usual manner for this type of shatter resistant film. As described above this is a polyester film having a water activated, pressure sensitive adhesive. The sheets of glass 2, 3, 4 and 5 can be standard window glass.

For the embodiment as shown in FIG. 1 several tests were performed with a 0.22 high velocity rifle.

In the first test 197 mils (5 mm) fixed sheets of glass were used with a gap of 125 mils (3.175 mm). A polyester shatter resistant film from 3M having a thickness of 7.09 mils (0.18 mm) was used. A single shot fired at the glass screen resulted in the front sheet 2 being shattered but without the film 10 on the rear surface of that sheet being penetrated. The second sheet of glass namely sheet 3 of FIG. 1 fractured presumably as a result of the shock waves emanating from the impact.

A second test with a panel of glass sheets having the same characteristics as for the first test but using 158 mils (4 mm) thick glass was performed. Several shots were fired. The first shot produced results similar to the first test. A second shot resulted in the third sheet of glass, namely sheet 4 in FIG. 1 being broken while a third shot resulted in the fourth sheet of glass, namely sheet 5 in FIG. 1 also being broken but without the bullet penetrating beyond that sheet of glass.

The glass-polyester film laminate is a composite structure with the film increasing the tensile strength of the glass sheet alone. This means that the structure can be deformed to a greater degree (absorb more kinetic energy) before fracturing occurs. The more kinetic energy is absorbed, the slower the bullet moves after fracturing the sheet of glass.

A projectile fired from a firearm can travel at a supersonic speed producing shock waves. Damage to a glass sheet will thus occur as a result of both the high kinetic energy of the projectile and the energy associated with the shock waves. As it is understood in the present invention, these energies are efficiently absorbed by the multiple layers of the glass in two ways. The kinetic energy of the projectile is absorbed more efficiently in each sheet by increasing the tensile strength of the glass sheet alone. This is done by securely bonding the thin layer of security film to one or both faces of the glass sheet. The air gap between sheets is used to dissipate the energy of the shock waves. It is the combination of these two aspects of the invention that provides an efficient bullet resistant screen.

Tests done on arrays of glass sheets coated on each side with polyester film have shown an improved resistance to damage as the separation between each sheet is increased. This result is presumably due to the dissipation of the shock waves in the air gap between each sheet.

Screens can be made with air gaps or separations between glass sheets of 31.3–3846 mils (approx. 1–100 mm) and glass sheets of 78–473 mils (2–12 mm) thicknesses can be employed, depending on the requirements of a given application. The separation between sheets and the thicknesses of sheets can be varied for a particular screen, as can the number of sheets used in a screen as required.

Other manufacturers of security film products suitable for use with the invention are DTI (Deposition Technology Industries) and Martin's Processing (Australia) Pry. Ltd., who market a safety film under the Registered Trade Mark PROFILON.

The present invention therefore provides a bullet resistant screen for use in such areas as the security cages for bank tellers and at other installations such as service stations where visibility in addition to security is required. The present invention is capable of being assembled on site using the skills of an ordinary glazier and without the need to resort to special tools to cut the glass sheets. It is contemplated that the shatter resistant film will normally be applied at manufacture saving this one step in assembly of the security screen. However it is to be understood that this is not necessary.

Though the invention has been described above with respect to a preferred embodiment it is to be understood that the invention has other embodiments within the knowledge of a person of ordinary skill in the art, for example, the security screen could be made with as few as two sheets of glass, depending on the application. In addition though the preferred embodiment shows each sheet of glass as having a film on both sides of the sheet of glass it is also contemplated that a sheet of glass may only be laminated on one face of the sheet. Equally, the outermost sheets may only have the film applied on their internal face with their external surfaces free of a layer of film. Other thicknesses of glass or combinations of glass layers of different thicknesses as well as other types of glass as described in the above embodiment are also contemplated.

I claim:

1. A bullet resistant glass screen consisting essentially of a plurality of sheets of glass, each sheet of glass having a front and rear surface to each of which is applied a shatter resistant film thereby defining a laminate, said shatter resistant film being a means for increasing the resistance of the sheet to shattering, each laminate being separated from a neighboring laminate by a separation in the range 1–100 mm. as measured between opposed surfaces and wherein said separation between each laminate is filled with air.

2. A bullet resistant glass screen as claimed in claim 1 wherein said glass sheets are 2–12 mm. thick.

3. A bullet resistant glass screen as claimed in claim 1 wherein said film comprises a polyester film.

4. A bullet resistant glass screen as claimed in claim 3 wherein said glass sheets are 2–12 mm. thick.

* * * * *